Feb. 1, 1927.

W. STEINKELLNER 1,615,920

MACHINE FOR MAKING BUTTERED SLICES OF BREAD OR THE LIKE

Filed Oct. 13, 1924    3 Sheets-Sheet 1

Inventor
W. Steinkellner

Feb. 1, 1927.
W. STEINKELLNER
1,615,920
MACHINE FOR MAKING BUTTERED SLICES OF BREAD OR THE LIKE
Filed Oct. 13, 1924   3 Sheets-Sheet 2

Inventor
W. Steinkellner
By Marks Clerk
Attys.

Feb. 1, 1927.
W. STEINKELLNER
1,615,920
MACHINE FOR MAKING BUTTERED SLICES OF BREAD OR THE LIKE
Filed Oct. 13, 1924  3 Sheets-Sheet 3
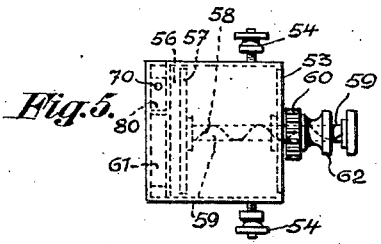
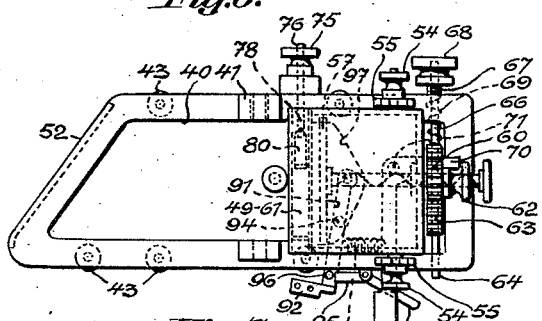
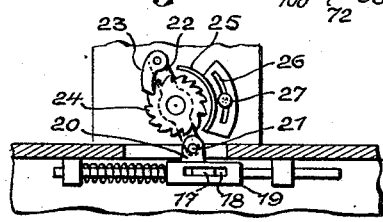
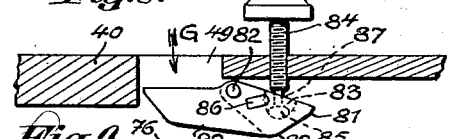
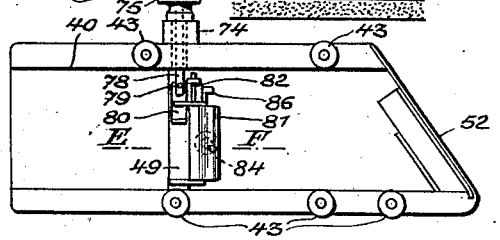

Patented Feb. 1, 1927.

1,615,920

UNITED STATES PATENT OFFICE.

WALTER STEINKELLNER, OF VIENNA, AUSTRIA.

MACHINE FOR MAKING BUTTERED SLICES OF BREAD OR THE LIKE.

Application filed October 13, 1924, Serial No. 743,507, and in Austria October 16, 1923.

This invention relates to improvements in machines for cutting and buttering slices of bread or the like.

One object of the present invention is the provision of means for adjusting the thickness of the butter or the like spread over the bread in accordance with the width of the bread inserted into the machine.

Another object is the provision of means for varying by hand the quantity of butter or the like according to the thickness of the bread.

A further object is the provision of means for adjusting the quantity of butter or the like independently of the cross sectional area of the bread.

One mode of carrying out the present invention is illustrated by way of example on the accompanying sheets of drawings in which—

Fig. 5 illustrates the butter box,

Fig. 6 a slide for operating the cutter or knife, and

Fig. 7 a mechanism for feeding forward the bread.

Fig. 8 illustrates a device for adjusting the thickness of the butter to be spread over the bread, and Fig. 9 is a back view of the slide shown in Fig. 6

Figure 1:
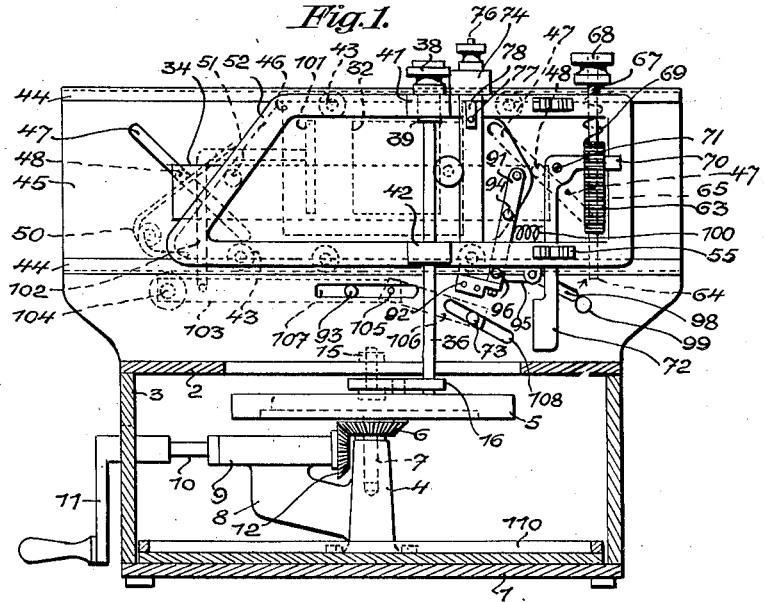
Fig. 1 illustrates in section a front view of the machine with the butter-box removed, the section being taken on line B—C of Fig. 3.
Figure 2:
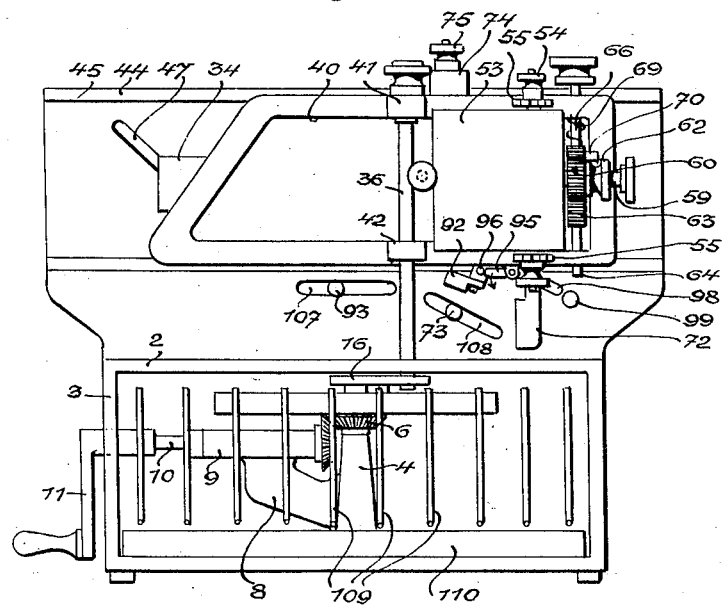
Fig. 2 is a front view of the complete machine.
Figure 3:
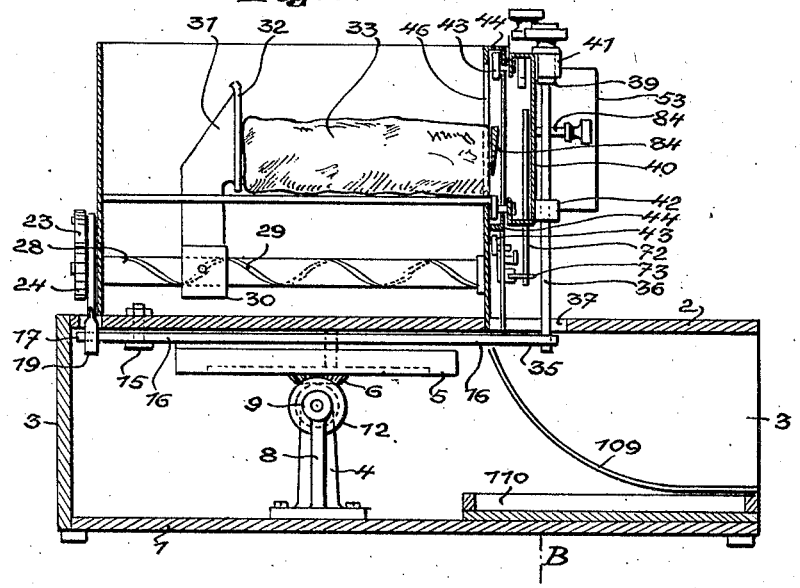
Fig. 3 is a sectional view of the machine, the section being taken on line A—D of Fig. 4.

The wooden lower box or receptacle consists of a floor or bottom 1, a cover 2 and lateral walls 3. A bearing-post 4, screwed to the floor 1, serves for the reception of a flywheel 5 furnished with a bevel-wheel 6 and a pin 7, which is rotatably mounted in the said post 4. The horizontal bearing 9 of an arm 8 secured to the bearing-post 4 serves for the reception of a shaft 10, which may be rotated by means of a removable handle or crank 11. A bevel-wheel 12, meshing with the bevel-wheel 6 of the fly-wheel 5, is secured to the inner end of the said shaft 10, for rotating the said fly-wheel on operating the handle 11. A crank-pin 13, secured to and projecting out of the fly-wheel 5, passes through a slot 14 of a lever 16, which is pivotally secured to the cover 2 by means of a pin 15. The short arm 17 of the said lever extends into the slot 18 of a guide 19 (Fig. 7), the latter being furnished with upwardly extending bearings 20 and being pivotally connected to a locking lever 22 by means of a pin 21. A pawl 23, pivoted to the said locking lever 22, engages a ratchet wheel 24 and rotates the latter anti-clockwise for a certain distance during every to and fro movement of the lever 17. In order to regulate the extent of this rotation a curved member 25 is provided, which can be adjusted and fixed a smaller or larger distance away from the pawl 23 by means of a setscrew 27, passing through a slot 26 of the said member 25. The ratchet-wheel 24 will be rotated for a greater extent by the pawl 23 in case the distance between the latter and the forward end of the curved member 25 is increased. Owing to this arrangement the machine can be adjusted in such a manner, that the thickness of the slices of bread or the like to be cut can be regulated according to requirement. As shown in Figs. 1 and 2, the ratchet-wheel 24 is secured to one end of a feed-shaft 28, provided with a screw-thread 29. A nut 30 is mounted on the shaft 28 and engages the screw-thread 29 of the latter and further is provided with an arm 31, which carries a plate 32; the latter resting against one side of the loaf of bread and pushes the same against the cutter 34. Therefore on feeding forward the ratchet-wheel 24, the shaft 28 is rotated and the loaf is fed forward a corresponding distance.

The forward end of the lever 16 is furnished with a slot 35, which is engaged by a feed-spindle 36, passing through an opening 37 of the cover 2. The upper end of this spindle is provided with a knob 38 and directly underneath the latter with a screw-thread 39, which passes through and cooperates with a nut 41, attached to the top side of the cutter-slide 40. A member 42, through which the spindle 36 passes and which is fixed to the bottom side of the slide 40, serves for the guidance of the spindle 36. On turning the handle 11, the lever 16 performs a to and fro movement and transmits the latter to the slide 40 by means of the spindle 36. Rollers 43, operating in U-shaped guides 44 of the transverse wall 45, are secured to the slide 40.

In the middle the transverse wall is furnished with an opening 46 for the free passage of the bread. Further the transverse wall is provided with two augularly disposed slots 47 for the guidance of sliding pins 48 secured to the cutter 34. A spring 50, disposed behind the transverse wall 45, acts against the left hand side sliding pin 48 and has the tendency to force the cutter into its highest position. A pin 51 is riveted to the front face of the cutter and forces downwards towards the right hand side the angularly disposed sliding rail 52 of the slide 40, when the latter moves to the right hand side, whereby the cutter 34 is moved downwards and cuts off a slice from the loaf moved forward by the plate 32.

For the sake of clearness the cutter is shown in its lowest position, while the buttering arrangement is still illustrated in the open position. However, actually the cutter ought to be in the highest position, as at first the bread is buttered and subsequently the slice is cut off.

The bread is buttered in the following manner:—

The butter-receptacle 53 (Fig. 5) is secured to bearing 55 (Fig. 6) of the slide 40 by means of screws 54. The butter is arranged in the left hand side space 56 of butter-receptacle, the drawing illustrating the latter without butter. A ram 57, fixed to a shaft 59 furnished with a screw-thread 58, forces out a corresponding quantity of butter through the openings 61 and 49 against the bread to be cut, as soon as a toothed wheel 60 is rotated to the left hand side. A pawl and ratchet wheel (not illustrated) are arranged in the interior of the said wheel 60. A screw-threaded knob 62, which acts as the nut of the screw-threaded shaft 59, is taken along by the toothed wheel 60 (by means of the pawl and ratchet-wheel arranged in the interior of the latter) during every anti-clockwise rotation of the same and presses the ram 57 against the butter. The movement of the toothed wheel 60 is carried out in the following manner:—

A up- and downwardly movable rack 63, which is in mesh with the toothed wheel 60, is arranged in a depression of the slide 40. The bottom end of the said rack terminates in a guide-bar 64 (Fig. 1), which is guided in a corresponding hole provided at the bottom end of the slide. The rack is furnished with a hole 65 for the reception of a pin 66, the upper end of which is screw-threaded at 67 and carries a knob 68. A tension spring 69 has the tendency to continuously force the rack to take up its highest position. In case the screw 67 is screwed farther out, the spring 69 pulls the rack upwards for the same distance. Behind the hole 65 the rack 63 is provided with a slot (not shown) through which the arm 70 of a crank-lever 72 is passed, the latter being rotatable about a pivot 71. In case the slide is pushed from the outermost left hand position into the outermost right hand position, the bottom end of the crank-lever 72 engages the projecting disengaging pin 73. The lever is lifted to such an extent that it can pass over the pin 73. Thereby the short arm 70 of the lever is forced downwards and takes with it the rack 63 and thus moves the toothed wheel 60, which moves the ram 57 against the butter and thus pushes the latter out of the opening 61. The disengaging pin 73 is arranged in such a manner, that it offers the crank-lever 72 a resistance during the right hand side movement only, while during the left hand side motion of the slide the said pin snaps slightly inwardly, similar to the blade of a pocket-knife.

In order to adjust the height of the butter-outlet-opening 61 according to the height of the bread, the slide 40 is provided with a screw-threaded stop 74 for a nut 76 resting on a head 75. A plate 78, furnished with a hole 77, can be adjusted in a higher or lower position by means of the said nut. A small slide 80 (Fig. 9) is suspended from the plate 78 by means of a small pin 79 and is adapted to open to a greater or small extent the opening 61 of the butter-receptacle and the corresponding opening of the slide according to the height of the bread.

The desired thickness of the butter spread over the bread is regulated by a scraper or spreader 81 (Figs. 8 and 9). The spreader 81 is rotatable about a pin 82 and provided with a recess 83, into which extends a knob 85 of the screw 84, the said knob being secured in the recess 83 by a wire 86, which is pushed inwards behind the knob 85 close to the neck 87 of the screw 84. On screwing the latter more into the slide-wall 40, the edge 88 of the spreader is brought nearer to the bread 89 and scrapes off a larger amount of butter. The wings 90 limit the maximum exit of butter. The following arrangement is provided in order that the exit of the butter may take place only at the time when the openings 49 and 61 pass in front of the bread. As soon as the opening 49 reaches the left hand side corner of the bread during the right hand side motion of the slide 40, a lifting block 92 (Fig. 1) screwed to a lever 91 contacts with a lifting bolt 93 and rotates the lever 91 about the pivot 94 to such an extent, till it takes up the position indicated in the drawing. Now the closing slide 97 pivotally secured to the lever 91, is in the open position. In this moment the arm 95 of the disengaging lever 98 snaps in front of the pin 96 riveted to the lever 91 and retains the entire arrangement for such a time in the open position, until during the movement to the right the end of the disengaging lever 98 slides over the projection 99 and thereby is raised to such an extent, that the arm 95 slides off the pin 96, and now the tension spring 100, secured to the lever 91, moves the closing slide 97 in front of the openings 61 and 49 respectively. During the movement of the slide 40 to the left, the lifting block 92 slides without any resistance over the backwardly moving lifting bolt 93 in the manner already described with reference to the crank-lever 72.

Figure 4:
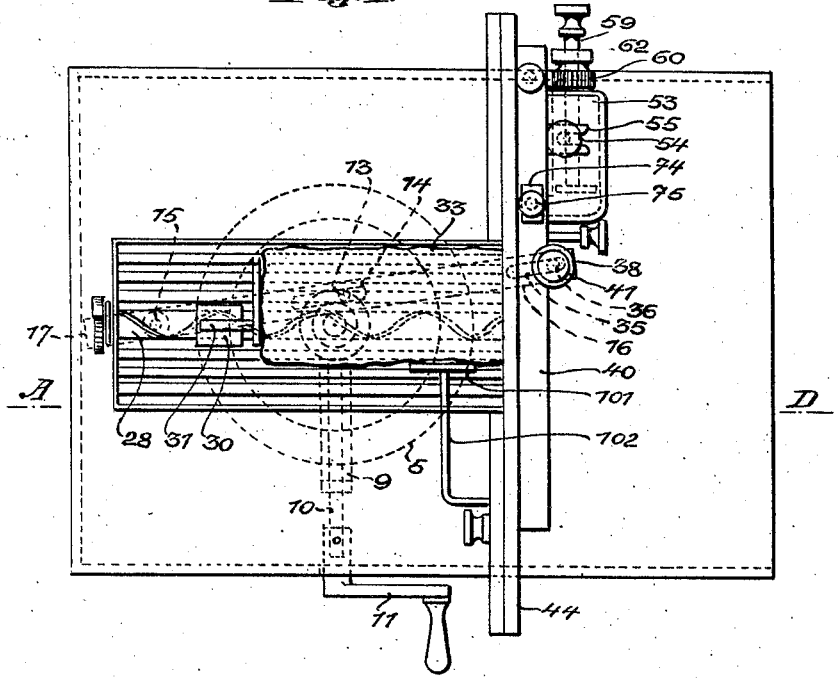
Fig. 4 shows the machine according to the present invention in plan view.

The following arrangement is provided for properly opening and closing the butter-exit-opening 61 for breads of different widths. A lateral adjusting plate 101 (Figs. 1 and 4) is connected to a flat bar 103 by means of a wire support 102 and a screw 104 attached to the said bar renders possible that the entire arrangement is fixed in any desired position. A flat bar 106 is pivotally attached to the bar 103 by means of a pin 105, and the lifting bolt 93 is slidably secured in a slot 107 of the bar 103. The short bar 106 carries the disengaging bolt 73, which is adapted to slide within an angularly disposed slot 108.

In case a bread of greater width is to be inserted into the machine, the lateral adjusting plate 101 is moved to the left hand side, whereby both flat bars 103 and 106 together with the bolts 93 and 73 fixed thereto are also moved to the left hand side. Thereby the bolt 73 is also raised and engages the crank-lever 72 somewhat higher up, so that the movement of the latter is enlarged and the rack 63 and toothed wheel 60 are moved to a greater extent, whereby the ram 57 forces a larger quantity of butter out of the opening 61. Owing to the bolt 93 disposed more to the left, the lever 91 and with it the closing slide 97 are brought into the open position at an earlier moment, and thus the butter is discharged sooner.

All working operations take place during the movement of the slide 40 to the right. First the butter is spread over the bread and subsequently the slice of bread is cut-off. The cut-off buttered slices drop onto a grating 109 and slide forwards. The bread crumbs drop into a drawer 110. However any other material than butter, for instance lard, jam and so forth may be employed in the machine.

I claim—

1. In a machine for slicing and buttering bread and the like, a bread receptacle, a movable bread loaf engaging plate in said receptacle, a movable member carrying said plate, a lifting bolt and a pin movable with said member, means normally tending to displace the plate to retain the latter in engagement with a bread loaf, butter feeding means actuated by said pin, butter cut-off means associated with the feeding means and actuated by said lifting bolt, the quantity of butter fed by the said feeding means, and the time of opening of the cut-off means varying according to the size and shape of the bread loaf, and the consequent position of the pin and the lifting bolt.

2. A machine as claimed in claim 1 characterized by the provision of means for varying the width of the area supplied with butter by the butter feeding means.

3. A machine for making buttered slices of bread or the like, comprising in combination a bread-receptacle, and a butter receptacle, a slide carrying the bread-cutter secured to the bread-receptacle, means for adjusting the amount of butter to be spread over the bread, the said means comprising a rack secured to the said slide, a toothed wheel which meshes with the said rack and is attached to the butter-receptacle, a ram for moving forward the butter arranged within the butter-receptacle and connected to the said toothed wheel so as to be moved forward by the rotation of the latter, and a crank-lever for raising the said rack in order to adjust the amount of rotation of the toothed wheel and thus adjust the forward feed of the said ram.

4. A machine for making buttered slices of bread or the like, comprising in combination a bread-receptacle and a butter-receptacle, a slide carrying the bread-cutter secured to the bread-receptacle, means for adjusting the amount of butter to be spread over the bread, the said means comprising a rack secured to the said slide, a toothed wheel which meshes with the said rack and is attached to the butter-receptacle, a ram for moving forward the butter arranged within the butter-receptacle and connected to the said toothed wheel so as to be moved forward by the rotation of the latter, a crank-lever for raising the said rack in order to adjust the amount of rotation of the toothed wheel and thus adjust the forward feed of the said ram, a scraper for removing butter from the buttered bread, and means for adjusting the scraper in order to regulate the thickness of the layer of butter spread over the bread.

In testimony whereof I hereunto affix my signature.

WALTER STEINKELLNER.